United States Patent [19]

Bee

[11] Patent Number: 5,055,315

[45] Date of Patent: Oct. 8, 1991

[54] FROZEN PRODUCT AND METHOD OF MAKING IT

[75] Inventor: Rodney D. Bee, Eaton Ford, United Kingdom

[73] Assignee: Conopco, Inc., N.J.

[21] Appl. No.: 632,600

[22] Filed: Dec. 24, 1990

Related U.S. Application Data

[63] Continuation of Ser. No. 365,929, Jun. 12, 1989, abandoned.

[30] Foreign Application Priority Data

Jun. 14, 1988 [GB] United Kingdom ............... 8814075

[51] Int. Cl.$^5$ .................... A23G 9/06; A23G 9/04
[52] U.S. Cl. .................... 426/565; 426/524; 426/101; 426/477; 426/317; 62/1; 62/76
[58] Field of Search .............. 426/565, 566, 567, 68, 426/524, 477, 317, 312, 100, 101; 62/1, 2, 48, 76

[56] References Cited

U.S. PATENT DOCUMENTS

| | | | |
|---|---|---|---|
| 2,029,025 | 1/1936 | Justheim | 426/565 |
| 3,256,100 | 6/1966 | Bernstein et al. | 426/565 |
| 3,291,076 | 12/1966 | Flanigan et al. | 426/565 |
| 3,360,384 | 12/1967 | Kurzinski et al. | 426/565 |
| 3,365,304 | 1/1968 | Guterman | 426/565 |
| 3,503,757 | 3/1970 | Rubenstein | 426/565 |
| 3,969,531 | 7/1976 | Cornelius | 426/565 |
| 4,031,262 | 6/1977 | Nakayama et al. | 426/565 |
| 4,310,559 | 1/1982 | Mita | 426/565 |
| 4,393,660 | 7/1983 | Kleiner et al. | 62/69 |
| 4,398,394 | 8/1983 | Kleiner et al. | 62/69 |
| 4,398,395 | 8/1983 | Hinman et al. | 62/69 |
| 4,659,575 | 4/1987 | Fiedler | 426/565 |
| 4,738,862 | 4/1988 | Bee | 426/565 |

FOREIGN PATENT DOCUMENTS 0201143 12/1986 European Pat. Off. .
1050213 12/1966 United Kingdom .
1095004 12/1967 United Kingdom .

*Primary Examiner*—Jeanette Hunter
*Attorney, Agent, or Firm*—Brumbaugh, Graves, Donohue & Raymond

[57] ABSTRACT

Frozen product comprising $N_2O$ hydrate clathrate and method of preparing same.

6 Claims, No Drawings

FROZEN PRODUCT AND METHOD OF MAKING IT

This application is a continuation of application Ser. No. 07/365,929, filed on June 12, 1989, now abandoned.

Effervescent frozen products and their manner of manufacturing are known from EP-A-201 143, involving the incorporation of $CO_2$ hydrate clathrate in partly frozen or cooled ice mixes. EP-A-201,143 provides a method of preparing an ice confection product comprising combining particulate frozen water and a flavored liquid phase and thereafter further cooling the obtained mixture, which is characterized in that $CO_2$ water clathrate-containing particles are exposed to such pressure, temperature and $CO_2$ and water partial pressure conditions that a protective layer will be formed on the particle surfaces, and are mixed with the liquid phase which may contain solid ice, the liquid phase having a temperature such that frozen water would not be melted or dissolved overall in said liquid phase and afterwards the temperature of the mixture is lowered to a usual storage temperature for ice confections. Usually the liquid phase comprises water-ice crystals before the clathrate-containing particles are added, which water-ice crystals are in equilibrium with the liquid phase and are forming therewith a slurry. This slurry may be obtained in a usual manner by feeding the unfrozen mix to a scraped-surface heat exchanger wherein it is cooled to a temperature of about $-0°$ to $-7°$ C. or even lower. $CO_2$-water clathrate is meant to comprise any $CO_2$-containing clathrate such as double clathrates and mixed clathrates. For a better description thereof reference is made to D.W. Davidson; Clathrate Hydrates in water—A Comprehensive Treatise; Vol. 2, Chapter 3. Ed. Franks.

In practice it is to be preferred that the $CO_2$ water clathrate-containing particles are exposed to such $CO_2$ pressure and temperature conditions, that $CO_2$ will evolve from the particle surfaces until a protective ice layer is formed, which for practical purposes prevents further $CO_2$ evolution under atmospheric conditions at temperatures below the melting temperature of ice. Usually this protective ice layer is formed within 15 seconds and consequently the stabilization treatment is to be carried out for more than 15 seconds.

A protective layer can also be formed around the $CO_2$ water clathrate-containing particles by exposing these particles to a water-containing environment under such conditions that a layer of solid water condenses on the surfaces of the particles. This environment preferably comprises water vapor, which is condensed on the surfaces of the particles to form a solid protective ice layer thereon.

Although the particle sizes of the clathrate-containing particles can be of the same order as the ice particles in the ice confection product to which the clathrate is to be added, in practice preferably particle sizes of from 200 to 2000$\mu$ are used. By incorporating relatively large clathrate-containing particles, preferably having sizes in the range 0.2 to 1 cm, a product is obtained giving a peculiar sensation on eating. The term ice confection product is used in a broad sense, comprising products such as water-ice confection and ice-cream.

An object of the invention is to provide frozen confectionery products having different eating characteristics, such as taste, from what was known in EP-A-201,143.

In the continuing development of different compositions, tastes, structures and shapes, it was found that different tastes could be realized by using $N_2O$ instead of at least part of the $CO_2$ used. Moreover, $N_2O$ clathrate is more compatible with several sensitive food ingredients such as proteins.

Accordingly, this invention relates to a new frozen product comprising a mixture of water, sweetener, flavour, an edible gas-hydrate clathrate and, if required, stabilizer, emulsifier, protein, fat and/or air, characterized in $N_2O$ being at least part of the gas in the gas-hydrate clathrate.

Instead of an $N_2O$ hydrate clathrate, a mixture of $CO_2$ and $N_2O$ hydrate clathrates or a mixed clathrate can be used.

The invention also relates to a method of preparing a frozen product comprising combining ice particles which contain gas-hydrate clathrate and an at least partly fluid mixture of water, sweetener, flavour and, if required, stabilizer, emulsifier, protein and/or air, which method is characterized in that ice particles which contain $N_2O$ hydrate clathrate are mixed with said mixture, having a temperature at which no ice melts from said particles.

The invention will be exemplified by the following nonlimiting Example.

EXAMPLE

An ice mix containing:

|  | % by weight |
| --- | --- |
| fat | 10 |
| msnf | 10 |
| sugar | 18 |
| cocoa | 2.5 |
| chocolate liquor | 1.5 |
| stabilizer | 0.2 |
| water to | 100 | is processed in a usual manner and finally whipped and frozen in a scraped-wall heat exchanger to $-5°$ C. to prepare a creamy, soft-frozen chocolate ice mass. Particulate $N_2O$ clathrate having a particle size of from 0.5 to 3 mm is admixed in an amount of 10% by weight to the creamy chocolate ice, which is thereafter stored below $-20°$ C.

I claim:

1. A frozen confectionery product comprising a mixture of water, sweetener, flavour, protein and an edible, protein-compatible gas-hydrate clathrate in ice particle form, wherein $N_2O$ forms at least part of the gas in the clathrate.

2. A product according to claim 1, wherein the clathrate comprises both $N_2O$ and $CO_2$.

3. A product according to any one of claims 1 or 2, wherein the clathrate is a mixed clathrate of $N_2O$ and $CO_2$.

4. A product according to any one of claims 1, 2 or 3, wherein the product additionally comprises one or more constituents selected from the group consisting of stabilizers, emulsifiers, fats and air.

5. A method of preparing a frozen confectionery product comprising combining ice particles which contain a protein-compatible gas-hydrate clathrate and an at least partly fluid mixture of water, sweetener, protein and flavour, wherein ice particles which contain protein-compatible $N_2O$ hydrate clathrate are mixed with said mixture, said product having a temperature at which no ice will melt from the said particles.

6. A method according to claim 5, wherein the fluid mixture additionally comprises one or more constituents selected from the group consisting of stabilizers, emulsifiers, and air.

* * * * *